Patented Apr. 20, 1948

2,440,202

UNITED STATES PATENT OFFICE 2,440,202

SOLID FIRE-RESISTANT CELLULOSE COMPOUND

Joseph H. Klaber, Conshohocken, Pa., and Johan Bjorksten, Chicago, Ill., assignors to Quaker Chemical Products Corp., Conshohocken, Pa.

No Drawing. Application March 7, 1945, Serial No. 581,562

9 Claims. (Cl. 106—186)

This invention relates to plastic compositions and to articles made therefrom; more specifically to modified cellulose ester and ether materials.

An object of the invention is to impart to cellulose ester compositions and to articles made therefrom, an unusual degree of resistance to fire.

Another object is to provide cellulose acetate compositions more easily extruded, pressed or molded, and having a high degree of thermoplasticity.

Another object is to provide new and useful chemical compositions.

Further objects will become apparent as the following detailed description proceeds.

Heretofore cellulose ester compositions have been used in diverse types of film, such as motion picture films, of transparent wrapping materials, in filaments, and fabrics produced therefrom; in molded and extruded products of various kinds, and the like. While cellulose acetate is considerably more fireproof than the highly flammable cellulose nitrate, the fire resistance of cellulose acetate has still been insufficient for many purposes, and the same applies to the other plastic cellulose esters and ethers.

Particularly in various military applications calling for a light or transparent plastic, e. g., in parachute fabrics, airplane parts and the like, an increased fireproofness is highly desirable, and frequently essential. The present invention furnishes a novel means for attaining such fireproofness.

According to this invention we modify the cellulose esters and ethers by the addition of a suitable amount of a chemical characterized by compatibility with the cellulose derivatives considered, and by the property of imparting fire resistance to these specific materials. For this purpose we select thiourea or a derivative thereof which has a nitrogen content of at least about 20%. The preferred material is thiourea, but the substitution derivatives such as, for example, sym-dimethyl thiourea, monobutyl thiourea, ethyl methyl thiourea, regardless of whether the ethyl and the methyl groups are attached to the same or to different nitrogen atoms, isopropyl thiourea, and the like were all found suitable for the purposes of this invention. Thiourea derivatives containing more than 4 carbon atoms in their chains are not preferred, although they have some moderate efficiency for the purposes of the invention. We have found that those derivatives which are soluble in the celluloses and which contain at least about 20% of nitrogen will be suitable for the purposes we are considering. Most nitro derivatives tested were not suitable for the reason that they were not soluble in the cellulose derivatives. Obviously, solubility in the cellulose derivatives contemplated is a prerequisite for a successful compound.

The inclusion in the compound of .1% up to about 10% and more of free long chain fatty acids with from 8 carbon atoms upward, tends to protect the composition against discoloration.

We are aware of the fact that thiourea has previously been employed in conjunction with various cellulosic fibers and materials. However, the present invention is distinct from certain prior art in that it contemplates a uniform homogeneous solution of the thiourea derivatives in the cellulosic material, and in that the thiourea is free and unreacted in contradistinction to such compounds of prior art which contain cellulose derivatives in conjunction with the products of a reaction between thiourea, or the like, and aldehydes present not contemplated in the present invention. The invention is further illustrated by the following specific examples which we give here only as illustrations, and not in any sense of limitation or restriction whatever:

Example I 90 parts by weight of granular cellulose acetate were intermixed intimately with 10% of thiourea and 2% of N-isopropyl N'-methyl thiourea. The composition was then melted in an oil bath with agitation so that a completely uniform mixture was obtained. This mixture was allowed to solidify to a solid mass. The mass was found to be fire resistant. In addition, the melting point of the mass was approximately 50° F. lower than the melting point of the cellulose acetate as such, which greatly facilitated handling or extrusion of the composition.

Example II

98% of cellulose propionate were melted with 2% of thiourea. The resultant compound was found to have a very high fire resistance and while some initial combustion would take place, the fire would become extinguished spontaneously, and would consume only a small part of the composition even when this was cast to form very thin sheets of filament.

*Example III*

1% of thiourea was dissolved in melted cellulose acetate. In order to facilitate the melting, $\frac{1}{10}$ of the weight of these ingredients of butyl acetate was added and was evaporated in vacuum after the melting had taken place and after a completely uniform composition had been obtained. The resultant composition was cast to form thin sheets. These had a marked fire resistance, the films being extinguished spontaneously before more than a small part thereof had burned.

*Example IV*

A composition of .1% of methyl thiourea and 10% of ethyl cellulose was dissolved in a large excess of a volatile solvent, the exact amount of this volatile solvent not being of essence since none of it remained in the final dry composition. The product thus obtained upon evaporation formed a film having a marked resistance to fire.

*Example V*

20 parts by weight of ethyl cellulose, 10 parts by weight of cellulose proprionate, and 5 parts by weight of cellulose butyrate were dissolved in 500 parts of acetone. 3 parts of thiourea and 1 part of methyl thiourea were added. The composition on casting formed a clear film which had an excellent resistance to fire. The flexibility of this film was further enhanced by including in the composition about ½% of butyl carbitol, 2% of castor oil, and 1% of lauric acid, this last ingredient having also the function of counteracting discoloration.

Generally, compositions containing 1% or more of thiourea in the total solid matter of the composition have a marked fire resistance. Compositions containing more than 2% of thiourea have a very good fire resistance, and compositions containing 3% and more will be completely fire resistant. Thiourea is somewhat more potent in this regard than the substitute thiourea derivatives; and generally, the less the percentage of nitrogen the less will be the protective potency. However, compounds containing as little as 20% of nitrogen in the molecule of the thiourea derivative still exert a very marked fire protective influence.

Considerable utility has been found in solutions of cellulose derivatives, the evaporation residues of which are fire resistant by virtue of their content of at least 1% of thiourea or of a thiourea derivative containing at least about 20% of nitrogen, and the solvent constituents of which are volatile. For example, a solution of any of the compounds of the above examples in 1 to 25 times its weight of a volatile solvent is suitable as a medium to deposit non-combustible films. A preferred embodiment is a solution of .4% of thiourea and 9.6% of cellulose acetate in 10% ethyl acetate, 5% butyl acetate and 75% of acetone.

In the examples given above, the various cellulose esters and ethers can be used interchangeably. Also the invention includes compositions comprising several different cellulose esters and/or ethers in the same composition.

While acetone has been shown in the example as the volatile solvent, and "butyl carbitol" and "carbitol" and castor oil as less volatile solvents, and plasticizers, respectively, it is fully realized that the nature of such substances is not critical to the invention. Instead of acetone we may use any other volatile solvent which is capable of dissolving the ingredients; for example, we may use ethyl acetate, butyl acetate, mixtures of these also containing ethyl, methyl, amyl or other alcohols, cyclohexanone, dioxane, methyl iso butyl ketone, and mixtures thereof, and the like, and as plasticizers we may use the sulfonamides, "benzyl carbitol," dibutylphthalates, shortly, any plasticizer compatible with the composition. We may also include in the composition pigments, clay fillers, and other similar inert ingredients customary or useful in compositions of this nature or in articles made therefrom. Obviously, any kind of solid articles may be fashioned from the composition disclosed, but the principal application envisioned is the continuous production of longitudinally extended articles such as films made on a conveyor, or filaments suitable for textile purposes made by extrusion.

From the viewpoint of flame resistance and of applications here envisioned, cast films and extruded filaments are equivalent, because if the filament were extended sidewise it would be a film, and if the film were made extremely narrow it would be a filament. The behavior of films and filaments in the present invention is therefore essentially the same.

It is thus evident that the invention is capable of wide variation. The examples and specific ingredients and proportions have been given only to illustrate, and are not to be construed in any sense of limitation whatever. The invention is to be restricted only by the following claims in which it is intended to cover all the novelty inherent therein as broadly as possible in view of the prior art.

Having thus disclosed our invention, we claim:

1. A plastic cellulosic composition in solid form comprising a solid cellulosic derivative selected from the group consisting of cellulose esters and cellulose ethers and between about 1% and about 12% of a substance selected from the group consisting of thiourea and alkyl substituted thioureas soluble in said cellulosic derivative and containing at least 20% nitrogen, dissolved in solid solution in and distributed uniformly through said solid cellulosic derivative to impart fire-resistance thereto.

2. The product of claim 1, wherein the cellulosic derivative is a cellulose ester.

3. The product of claim 1, wherein the cellulosic derivative is a cellulose ether.

4. The product of claim 1, wherein the substance imparting fire-resistance to the cellulosic derivative is thiourea.

5. The product of claim 4, wherein the cellulosic derivative is cellulose acetate, and wherein the thiourea is present in an amount between about 3% and about 10%.

6. The product of claim 4, wherein the cellulosic derivative is ethyl cellulose, and wherein the thiourea is present in an amount between about 3% and about 10%.

7. As an article of manufacture, a longitudinally extended plastic cellulosic body in solid form, comprising as principal effective ingredients a solid cellulosic derivative selected from the group consisting of cellulose esters and cellulose ethers, and between about 1% and about 12% of a substance selected from the group consisting of thiourea and the alkyl substituted thioureas soluble in said cellulosic derivative and containing at least 20% nitrogen dissolved in solid solution in and distributed uniformly through said solid cellulosic derivative to impart fire-resistance thereto.

8. The product of claim 7, wherein the said cellulosic body is a cast film.

9. The product of claim 7, wherein the said cellulosic body is an extruded cylindrical article.

JOSEPH H. KLABER.
JOHAN BJORKSTEN.

REFERENCES CITED

The following references are of record in the file of this patent:

UNITED STATES PATENTS

| Number | Name | Date |
|---|---|---|
| 1,867,658 | Dreyfus | July 19, 1932 |
| 1,977,642 | Moss | Oct. 23, 1934 |
| 2,039,301 | Dreyfus | May 5, 1936 |
| 2,039,302 | Dreyfus | May 5, 1936 |
| 2,101,886 | Whitehead | Dec. 14, 1937 |
| 2,342,478 | Metz | Feb. 22, 1944 |

Certificate of Correction

Patent No. 2,440,202. April 20, 1948.

JOSEPH H. KLABER ET AL.

It is hereby certified that errors appear in the printed specification of the above numbered patent requiring correction as follows: Column 4, line 44, after the word "form" insert *characterized by fire-resistance*; line 50, after "nitrogen," insert *all of said substance being*; line 53, after "impart" insert *said*; line 71, claim 7, after "form" strike out the comma, and insert *characterized by fire-resistance,*; column 5, line 3, after "nitrogen" insert , *all of said substance being*; line 5, after "impart" insert *said*; and that the said Letters Patent should be read with these corrections therein that the same may conform to the record of the case in the Patent Office.

Signed and sealed this 8th day of June, A. D. 1948.

[SEAL]

THOMAS F. MURPHY,
*Assistant Commissioner of Patents.*